United States Patent
Liang et al.

(10) Patent No.: US 10,255,518 B2
(45) Date of Patent: Apr. 9, 2019

(54) IMAGE DETERMINING METHOD AND OBJECT COORDINATE COMPUTING APPARATUS

(71) Applicant: PixArt Imaging Inc., Hsin-Chu (TW)

(72) Inventors: Chia-Cheun Liang, Hsin-Chu (TW);
Shu-Sian Yang, Hsin-Chu (TW);
Yi-Hsien Ko, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 89 days.

(21) Appl. No.: 15/212,281

(22) Filed: Jul. 17, 2016

(65) Prior Publication Data

US 2016/0364627 A1    Dec. 15, 2016

Related U.S. Application Data

(63) Continuation of application No. 13/789,591, filed on Mar. 7, 2013, now abandoned.

(30) Foreign Application Priority Data

Aug. 8, 2012  (TW) .............................. 101128552 A

(51) Int. Cl.
*G06K 9/32* (2006.01)
*G06K 9/34* (2006.01)
(Continued)

(52) U.S. Cl.
CPC ............. *G06K 9/62* (2013.01); *G06K 9/3241* (2013.01); *G06K 9/342* (2013.01); *G06K 9/4604* (2013.01);
(Continued)

(58) Field of Classification Search
None
See application file for complete search history.

(56) References Cited

U.S. PATENT DOCUMENTS 5,229,594 A    7/1993    Vilaire
5,774,177 A    6/1998    Lane
(Continued)

FOREIGN PATENT DOCUMENTS

| CN | 102238358 A | 11/2011 |
|---|---|---|
| TW | 201108155 | 3/2011 |
| TW | 201141200 | 11/2011 |

OTHER PUBLICATIONS

Xie Zhaoli, Peng Qin, Bai Yingjie, "Algorithm research and SoPC implementation of connected component labeling of edge image", Electronic Technique Application, vol. 37, No. 3, 2011, Embedded Technology, College of Automation, Chongqing University, Chongqing 400030, China, p. 35-37, 41, Dec. 31, 2011.

*Primary Examiner* — Matthew C Bella
*Assistant Examiner* — Jose Torres
(74) *Attorney, Agent, or Firm* — Winston Hsu

(57) ABSTRACT

An image determining method for scanning an image and determining specific image pixels of a specific image. The method comprises: determining at least one pixel in a first row having brightness value larger than a threshold value as the specific image pixel; defining a leftmost pixel and a rightmost pixel of the specific image pixel in the first row as a leftmost edge and a rightmost edge of a first specific image range; and defining a second specific image range in a second row of the image, which is next to the first row. Column positions of a leftmost edge and a rightmost edge of the second specific image range are respectively the same with column positions of the leftmost edge and the rightmost edge of the first specific image range. Via this method, the determining for the specific image pixels is more accurate.

14 Claims, 6 Drawing Sheets

(51) Int. Cl.
  *G06K 9/46*      (2006.01)
  *G06K 9/62*      (2006.01)
  *G06T 7/11*      (2017.01)
  *G06T 7/136*     (2017.01)
  *G06K 9/00*      (2006.01)

(52) U.S. Cl.
  CPC ......... *G06K 9/4642* (2013.01); *G06K 9/6201* (2013.01); *G06T 7/11* (2017.01); *G06T 7/136* (2017.01)

(56) References Cited

U.S. PATENT DOCUMENTS

| | | |
|---|---|---|
| 5,815,590 A | 9/1998 | Buttner |
| 6,146,278 A | 11/2000 | Kobayashi |
| 6,236,466 B1 | 5/2001 | Chung |
| 7,031,517 B1 * | 4/2006 | Le .................. G06K 9/342 |
| | | 375/E7.13 |
| 7,623,115 B2 | 11/2009 | Marks |
| 7,796,116 B2 | 9/2010 | Salsman |
| 2008/0198129 A1 | 8/2008 | Cheng |
| 2008/0219566 A1 | 9/2008 | Teoh |
| 2009/0207318 A1 | 8/2009 | Ma |
| 2010/0220210 A1 | 9/2010 | Chen |

\* cited by examiner

IMAGE DETERMINING METHOD AND OBJECT COORDINATE COMPUTING APPARATUS

CROSS REFERENCE TO RELATED APPLICATIONS

This is a continuation application of U.S. patent application Ser. No. 13/789,591, filed on Mar. 7, 2013 and included herein by reference.

BACKGROUND OF THE INVENTION

1. Field of the Invention

The present invention relates to an image determining method and an object coordinate computing apparatus, and particularly relates to an image determining method and an object coordinate computing apparatus, which utilize both brightness and conditions besides brightness to determine the predetermined image pixel or the object pixel.

2. Description of the Prior Art

FIG. 1 is a schematic diagram illustrating a prior art image determining method for determining an object coordinate in an image. FIG. 1 is a gray level diagram of an image (i.e. an brightness diagram of an image), which is a 7×8 matrix having 7×8 pixels $P_{11}$-$P_{78}$. The image includes a specific image generated by an object (in this example, a light source). Specific image pixels for this specific image have higher brightness values than the pixels surrounding them, for examples, pixels $P_{16}$, $P_{25}$-$P_{27}$, $P_{34}$-$P_{38}$, $P_{43}$-$P_{48}$, $P_{54}$-$P_{57}$ and $P_{65}$-$P_{67}$.

One of the methods for determining the specific image pixels is determining the pixels having brightness values higher than a threshold value as specific image pixels. In the example shown in FIG. 1, the threshold value is gray level 100, such that the pixels $P_{26}$, $P_{35}$-$P_{37}$, $P_{44}$-$P_{47}$, and $P_{55}$-$P_{56}$ will be determined to be specific image pixels. However, the edge pixels for the specific image have lower brightness values, thus such determining method still determines the pixels $P_{16}$, $P_{25}$, $P_{27}$, $P_{34}$, $P_{38}$, $P_{43}$, $P_{48}$, $P_{54}$, $P_{57}$ and $P_{65}$-$P_{67}$ to be normal pixels rather than specific image pixels. If the threshold value is adjusted to be lower, such as 80, normal pixels $P_{75}$ and $P_{76}$ will be determined to be specific image pixels, but still exclude the pixel $P_{16}$. Also, the size, location and brightness values of different specific images caused by different objects are all different, thus a most suitable brightness threshold value is hard to select.

SUMMARY OF THE INVENTION

One objective of the present invention is to provide an image determining method utilizing brightness and parameters besides brightness to determine specific image pixels or object pixels, and provides an object coordinate computing apparatus utilizing the image determining method.

One embodiment of the present invention discloses an image determining method for scanning an image and determining which pixels in the image are specific image pixels of a specific image. The method comprises: determining at least one pixel in a first row of the image having brightness value larger than a threshold value as the specific image pixel; defining a leftmost pixel and a rightmost pixel of the specific image pixel in the first row as a leftmost edge and a rightmost edge of a first specific image range; and defining a second specific image range in a second row of the image, wherein the second row is next to the first row. A column position of a leftmost edge of the second specific image range is the same with a column position of the leftmost edge of the first specific image range. Also, a column position of a rightmost edge of the second specific image range is the same with a column position of the rightmost edge of the first specific image range.

Another embodiment of the present invention discloses an object coordinate computing apparatus, which comprises: a camera, for catching a gray level diagram for an image comprising at least one object image; a reading circuit, configured to scan the image and to determine which pixels in the image are object image pixels of the object image. The reading circuit performs following steps: recoding brightness values and coordinates for the pixels; determining at least one pixel in a first row of the image having brightness value larger than a threshold value as the object image pixel; defining a leftmost pixel and a rightmost pixel of the object image pixel in the first row as a leftmost edge and a rightmost edge of a first object image range; and defining a second object image range in a second row of the image, wherein the second row is next to the first row. A column position of a leftmost edge of the second object image range is the same with a column position of the leftmost edge of the first object image range. Also, a column position of a rightmost edge of the second object image range is the same with a column position of the rightmost edge of the first object image range. The reading circuit further utilizes the recorded brightness values and the recorded coordinate to compute a gravity center of the object.

In view of above-mentioned embodiments, the present invention provides an image determining method for determining specific image pixels or object pixels, an object coordinate computing method and an object coordinate computing apparatus, according to brightness and parameters besides brightness. By this way, the prior art issue that only brightness is utilized for determining can be avoided. Besides, different conditions can be set based on different object types and the size for caught images, such that the determining mechanism can be more accurate and can be set unlimitedly. Furthermore, the gravity center of the object can be moved downward if the gravity center is computed according to the image determining mechanism of the present invention. By this way, the gravity center matches the habit for a user while handling a remote controller, such that the displacement detecting can be more accurate.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a schematic diagram illustrating a prior art image determining method for determining an object coordinate in an image.

FIG. 2 and FIG. 4 are schematic diagrams illustrating image determining methods according to embodiments of the present invention.

DETAILED DESCRIPTION

Figure 3:
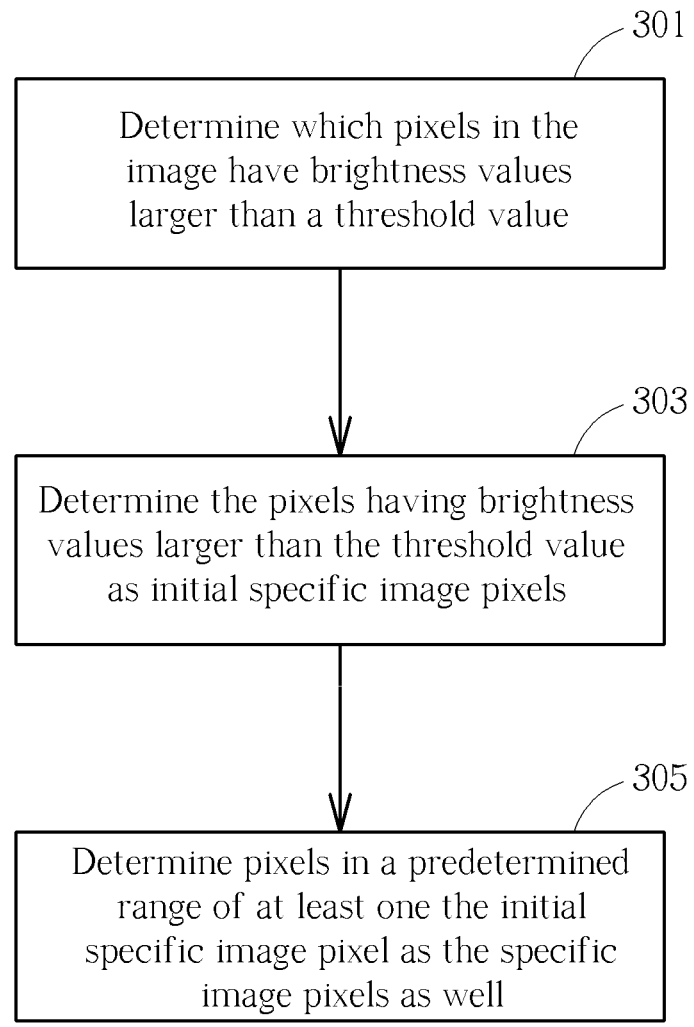
FIG. 3 and FIG. 5 are flow charts illustrating image determining methods according to embodiments of the present invention.

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

Figure 1:
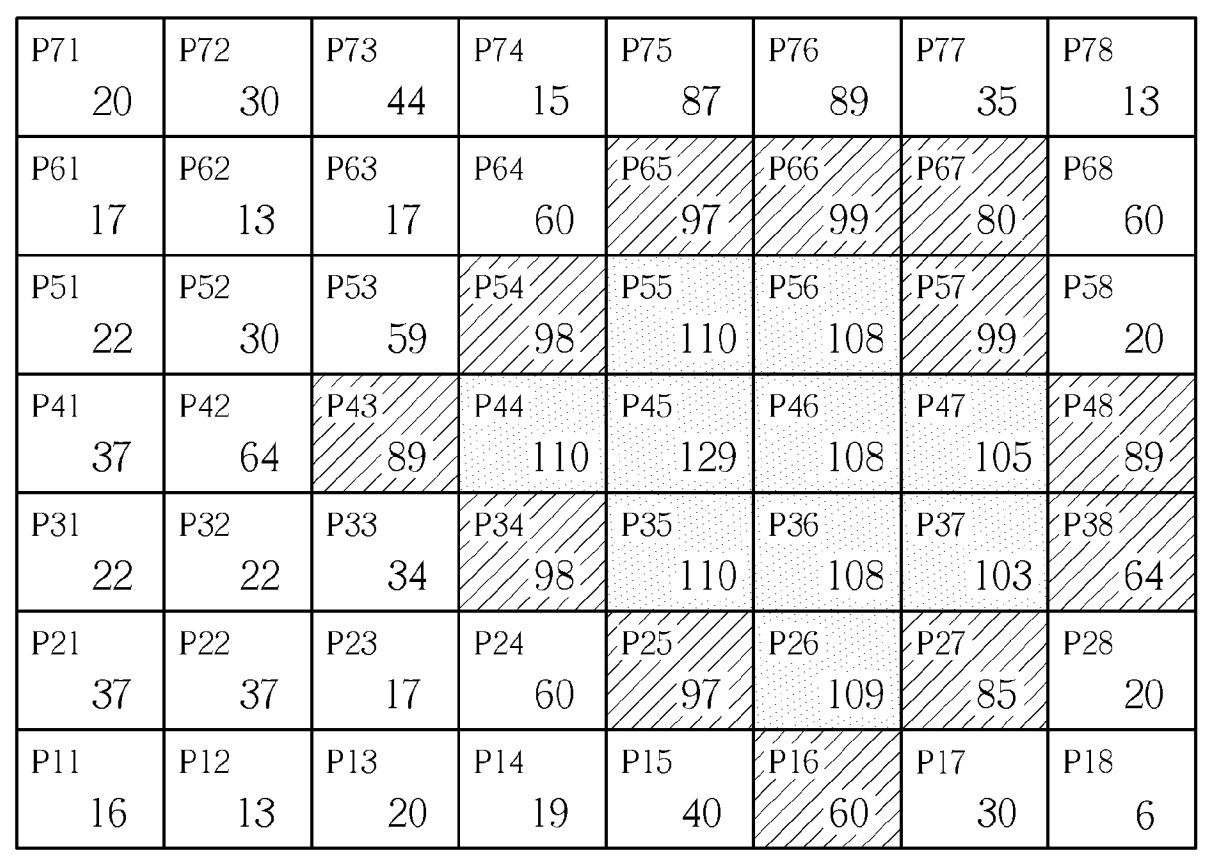
Figure 2:
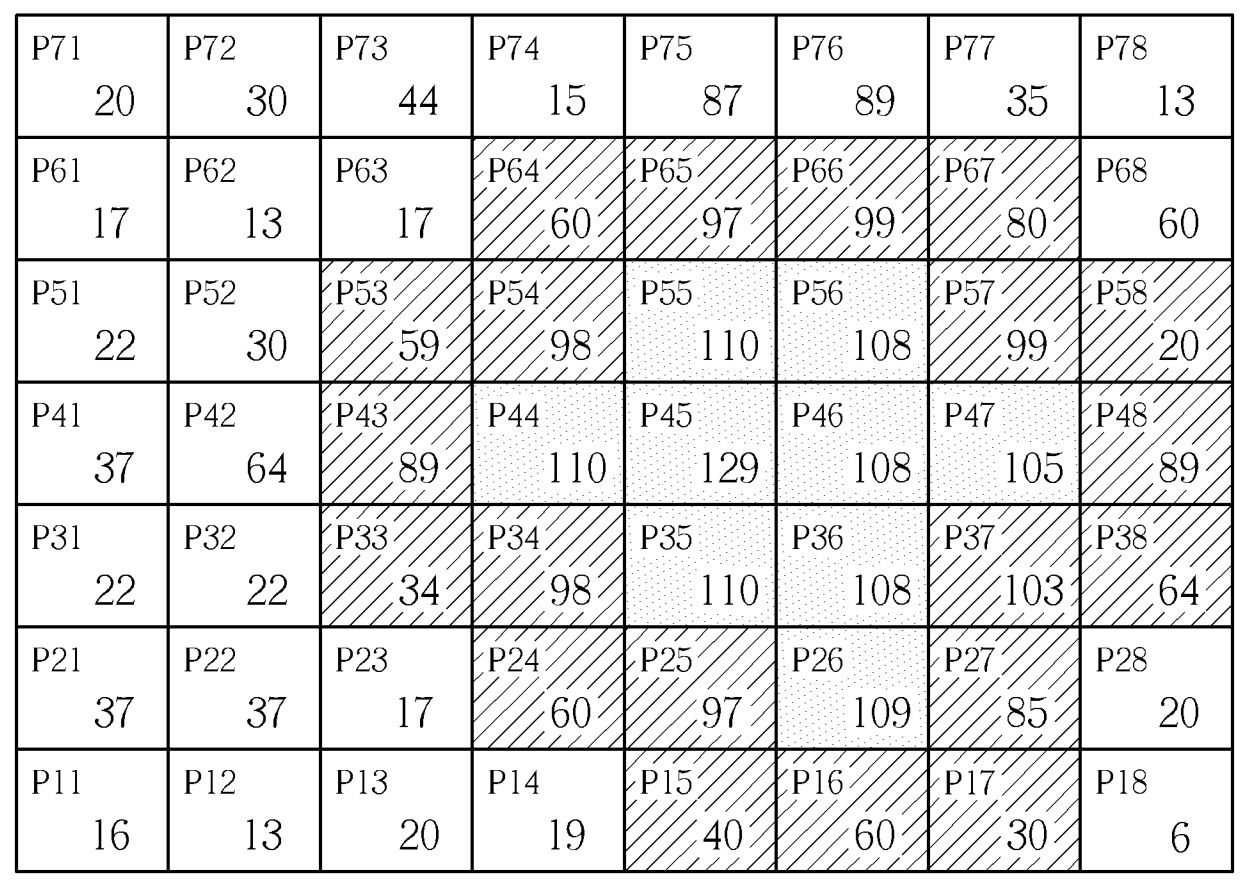
Figure 4:
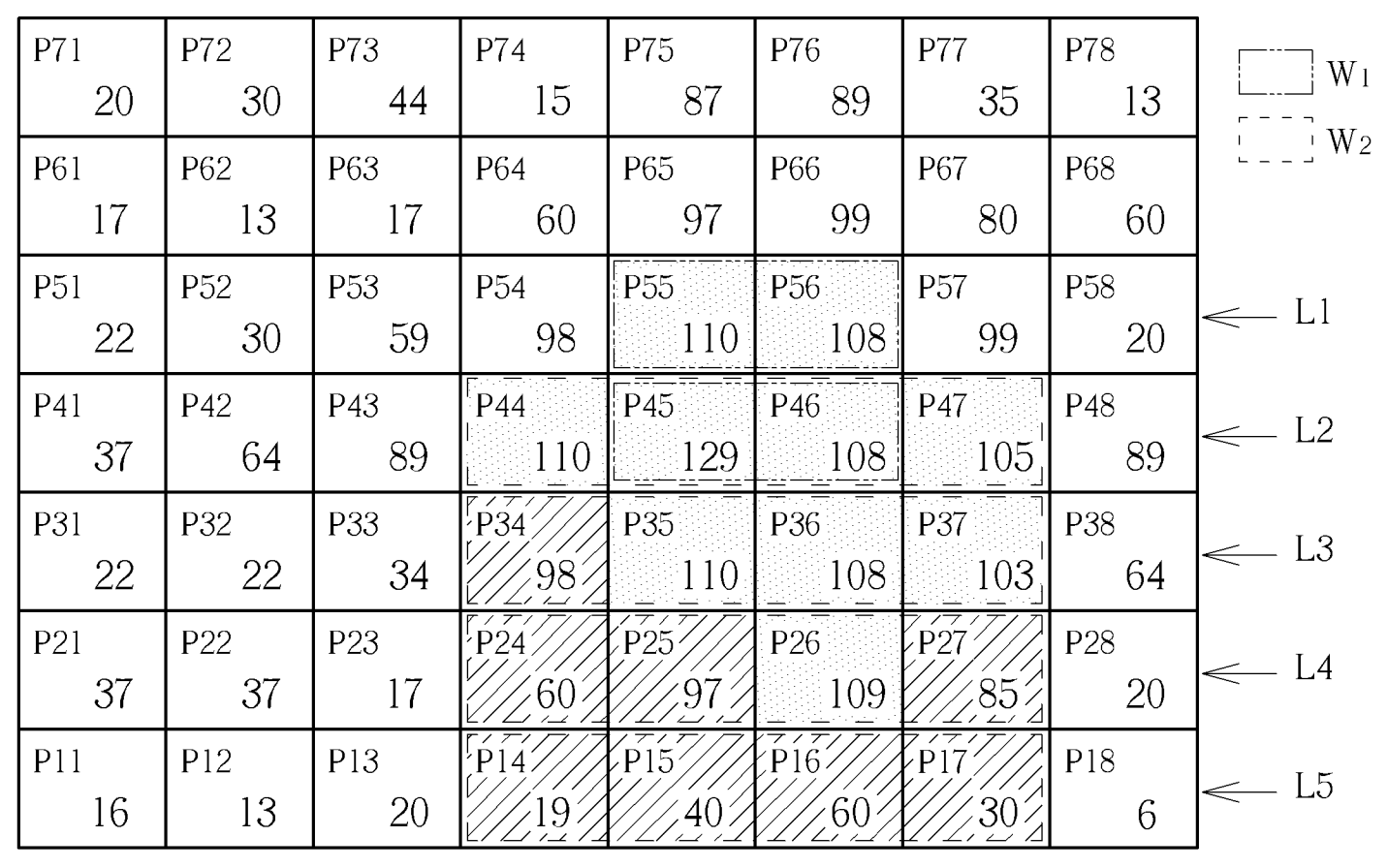

FIG. 2 and FIG. 4 are schematic diagrams illustrating image determining methods according to embodiments of the present invention. FIG. 2 illustrates a first embodiment while FIG. 4 illustrates a second embodiment. For the convenience for explanation, FIG. 2 and FIG. 4 utilizes the gray level diagram which is the same as which in FIG. 1, but it does not mean to limit the image determining method of the present invention is limited to this gray level diagram.

In the embodiment shown in FIG. 2, pixels in the image are determined that if any of them has a brightness value larger than a threshold value, and then the pixels having brightness values larger than the threshold value are determined as the initial specific image pixels. After that, specific image pixels including the initial specific image pixels are determined according to the initial specific image pixels. In this example, the threshold value is determined to be 100 as shown in FIG. 1, thus the pixels $P_{26}$, $P_{35}$-$P_{36}$, $P_{44}$-$P_{47}$ and $P_{55}$-$P_{66}$ are determined to be the initial specific image pixels. Please note this step can be performed via scanning and determining in turn, but the determining step can be performed after all rows have been scanned. After that, the pixels in a predetermined range of the initial specific image pixels are determined to be specific image pixels. In this embodiment, each initial specific image pixel is utilized as a center of a 3×3 pixel matrix to generate a pixel matrix, which is utilized to define the predetermined range. Also, each pixel in the pixel matrix is determined to be the specific image pixel. For example, the pixel $P_{44}$ is utilized as a center of the 3×3 pixel matrix, which includes pixels $P_{33}$-$P_{35}$, $P_{43}$-$P_{45}$, and $P_{53}$-$P_{55}$. These pixels are all determined to be specific image pixels. Since pixels $P_{35}$, $P_{44}$-$P_{45}$, and $P_{55}$ are all determined to be initial specific image pixels in the previous step, thus the step of utilizing the pixel $P_{44}$ as a center of the pixel matrix adds the pixels $P_{33}$-$P_{34}$, $P_{43}$, and $P_{53}$-$P_{55}$ to the group of specific image pixels.

Similarly, if the pixel P55 is utilized as a center of a 3×3 pixel matrix, the pixels $P_{54}$, and $P_{64}$-$P_{65}$ are added to the group of specific image pixels. If the same steps are performed for pixels $P_{26}$, $P_{35}$-$P_{36}$, $P_{44}$-$P_{47}$ and $P_{55}$-$P_{66}$, pixels $P_{15}$-$P_{17}$, $P_{24}$-$P_{25}$, $P_{27}$, $P_{33}$-$P_{34}$, $P_{37}$-$P_{38}$, $P_{43}$, $P_{48}$, $P_{53}$-$P_{54}$, $P_{57}$-$P_{58}$ and $P_{64}$-$P_{67}$ are added to the group of specific image pixels. However, it should be noted that the above-mentioned predetermined range is not limited to a pixel matrix with the same width and length, and is not limited to a pixel matrix as well. This predetermined range can be set according to other parameters, such as an image of the object type that is desired to be determined. Please note the initial specific image pixels and the specific image pixels determined according to the initial specific image pixels are both specific image pixels and have no difference. The reason for giving them different names is to make them more easily to be distinguished such that the concept of the present invention can be depicted for more clearly.

The image determining method shown in FIG. 3 can be acquired according to the first embodiment shown in FIG. 2, which includes the following steps:

Step 301

Determine which pixels in the image have brightness values larger than a threshold value.

Step 303

Determine the pixels having brightness values larger than the threshold value as initial specific image pixels (Such as pixels $P_{26}$, $P_{35}$-$P_{36}$, $P_{44}$-$P_{47}$ and $P_{55}$-$P_{66}$ in FIG. 2).

Step 305

Determine pixels in a predetermined range of at least one of the initial specific image pixels as the specific image pixels as well. In one example, the predetermined range is a 3×3 pixel matrix such that the pixels $P_{15}$-$P_{17}$, $P_{24}$-$P_{25}$, $P_{27}$, $P_{33}$-$P_{34}$, $P_{37}$-$P_{38}$, $P_{43}$, $P_{48}$, $P_{53}$-$P_{54}$, $P_{57}$-$P_{58}$ and $P_{64}$-$P_{67}$, which are not initial specific image pixels, are also determined to be specific image pixels.

Other detail steps can be acquired according to the embodiment shown in FIG. 2, thus are omitted for brevity here.

In the second embodiment shown in FIG. 4, pixels of at least one row in an image are scanned in turn and determined which pixels have brightness values larger than a threshold value. In FIG. 4, the direction for scanning is downward. That is, pixels $P_{71}$-$P_{78}$ are scanned first, then the pixels $P_{61}$-$P_{68}$ are scanned, then the pixels $P_{51}$-$P_{58}$ are scanned . . . and so on. If anyone row of the image (the first one row $L_1$ in this embodiment) is determined to include at least one pixel having a brightness value larger than a threshold value such as pixels P55, P56 (named first row specific image pixels), the first row specific image pixels are determined as specific image pixels and a specific image range $W_1$ is defined according to the first row specific image pixels. In one embodiment, the leftmost pixel and the rightmost pixel of the first row specific image pixels are utilized to define edges of the specific image range $W_1$, but it is not limited. Also, the image pixels in the specific image range $W_1$ of the next row are all determined to be specific images pixels while scanning the next row. For example, the pixels $P_{45}$, $P_{46}$ in the specific image range $W_1$ of the second row $L_2$ are determined to be specific images pixels, which are called second row specific image pixels inside the range, while scanning the second row $L_2$ including pixels $P_{41}$-$P_{48}$.

Pixels of the second row outside the specific image range $W_1$ are also determined to check if they have brightness values larger than the threshold value. If all the brightness values are less than the threshold value, the specific image range $W_1$ is kept, and the pixels in the specific image range $W_1$ are determined to be specific image pixels while scanning the rows after the second row. If at least one pixel located outside the specific image range $W_1$ of the second row, which is named a second row specific image pixel outside the range, has a brightness value larger than the threshold value, the second row specific image pixel outside the range is determined to be a specific image pixel. Additionally, the specific image range $W_1$ is updated according to the second row specific image pixel outside the range. The pixels in the updated specific image range of the next row are determined to be the specific image pixel while scanning the next row.

Take the embodiment shown in FIG. 4 for example, since the second row specific image pixels outside the range $P_{44}$, $P_{47}$, which are located outside the predetermined image range $W_1$, have brightness values larger than the threshold value 100, the second row specific image pixels outside the range $P_{44}$, $P_{47}$ are also determined to be specific image pixels and the specific image range $W_1$ is updated to be the specific image range $W_2$. The third row specific image pixels inside the range $P_{34}$-$P_{37}$, which are located inside the specific image range $W_2$ of the third row $L_3$, are determined to be the specific image pixels while scanning the third row $L_3$. Additionally, the pixels $P_{31}$-$P_{33}$, $P_{38}$ outside the specific image range $W_2$ of the third row $L_3$ are determined to check if they have brightness values larger than the threshold value. In the embodiment shown in FIG. 4, the brightness values of the pixels $P_{31}$-$P_{33}$, $P_{38}$ are not larger than 100, thus the specific image range $W_2$ is kept. The above-mentioned steps are performed while scanning the fourth row $L_4$, thus the pixels $P_{24}$-$P_{27}$ inside the specific image range $W_2$ are determined to be the specific image pixels and the specific image range $W_2$ is kept. The pixels $P_{14}$-$P_{17}$ inside the specific image range $W_2$ are determined to be the specific image pixels while scanning the fifth row $L_5$. However, the step for scanning this object and the step for updating the specific image range stop since no pixels in the fifth row $L_5$ have brightness values larger than the threshold value. The mechanism for stopping the scanning step and the updating step can be triggered via various kinds of methods. In one embodiment, if all pixels of a whole row, such as the above-mentioned fifth row $L_5$, have brightness values smaller than the threshold value, the scanning step and the updating step are stopped. In another embodiment, if all pixels in a specific image range of a row, such as the above-mentioned specific image range $W_2$ in the fifth row $L_5$, have brightness values smaller than the threshold value, the scanning step and the updating step are stopped. Furthermore, an image may include more than one object, therefore the next object may be scanned and the above-mentioned steps are repeated if the scanning steps for one object have been stopped. Therefore, more than one object can be detected while scanning an image. For example, the objects can be distinguished from each other depending on space relations if two objects are on one row. For example, the scanning step of one object is stopped if all pixels of a whole row have brightness values smaller than the threshold value. However, the scanning step of the other object is stopped if all pixels in a specific image range of a row have brightness values smaller than the threshold value.

Figure 5:
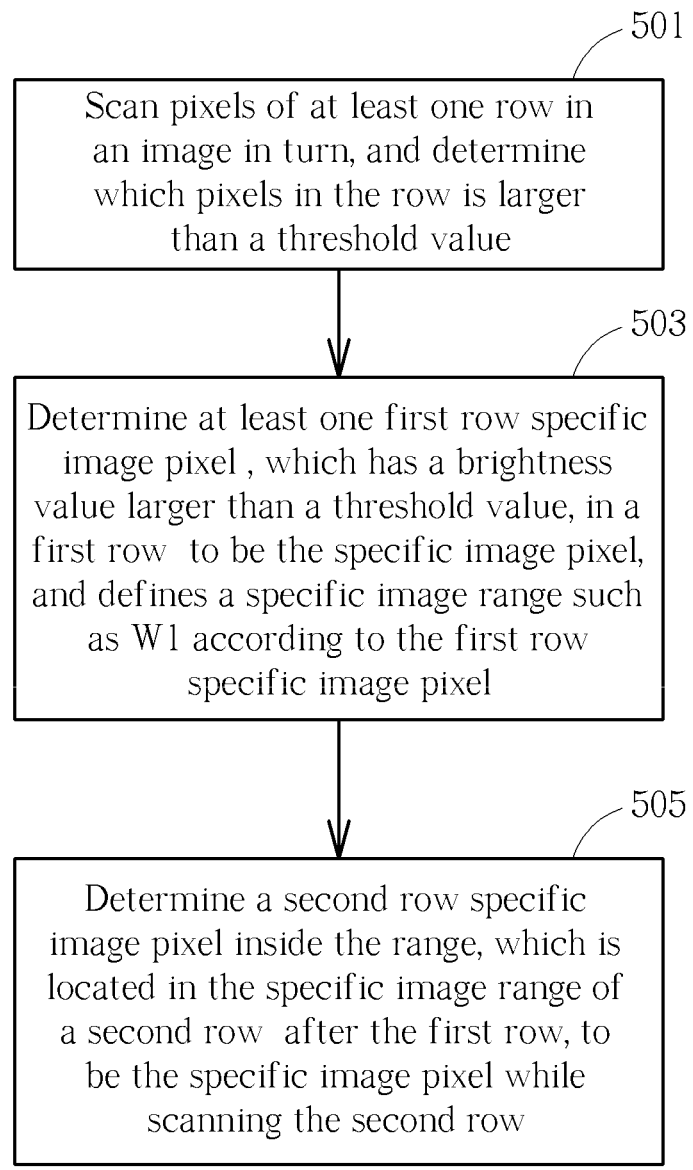

According to the second embodiment shown in FIG. 4, an image determining method shown in FIG. 5 can be acquired, which includes following steps:

Step 501

Scan pixels of at least one row in an image in turn, and determine which pixels in the row is larger than a threshold value.

Step 503

Determine at least one first row specific image pixel (such as $P_{55}$, $P_{56}$), which has a brightness value larger than a threshold value, in a first row (Such as $L_1$ in FIG. 4) to be the specific image pixel, and defines a specific image range such as $W_1$ according to the first row specific image pixel.

Step 505

Determine a second row specific image pixel inside the range (such as $P_{45}$, $P_{46}$), which is located in the specific image range of a second row (such as $L_2$ in FIG. 4) after the first row, to be the specific image pixel while scanning the second row.

Other detail steps can be acquired according to the embodiment shown in FIG. 4, thus it is omitted for brevity here.

Figure 6:
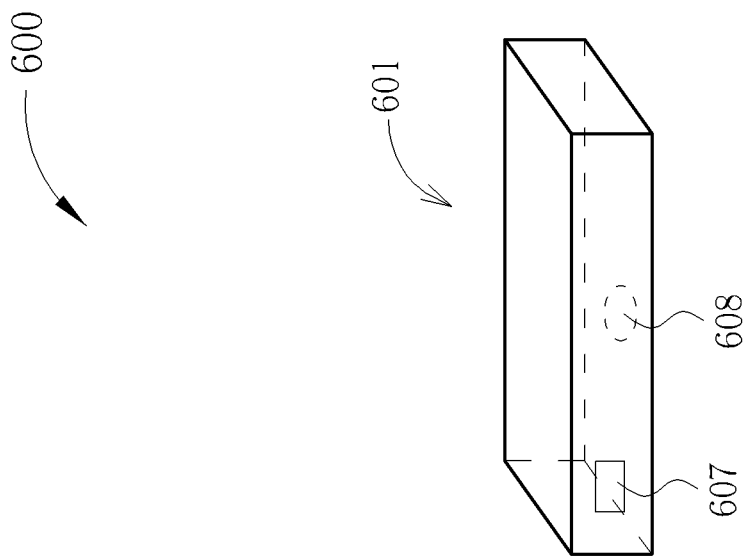
FIG. 6 is a schematic diagram illustrating an object coordinate computing apparatus utilizing the image determining method shown in FIG. 2 to FIG. 5.
Figure 6:
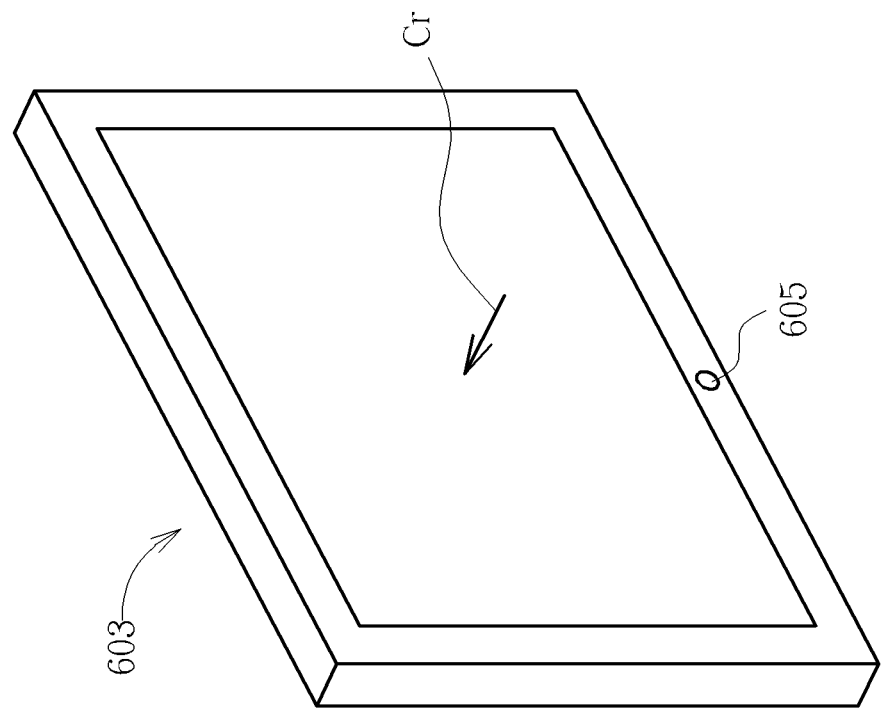

FIG. 6 is a schematic diagram illustrating an object coordinate computing apparatus 601 utilizing the image determining method shown in FIG. 2 to FIG. 5. The coordinate computing apparatus 601 is included in a displacement detecting system 600. Please note the displacement detecting system 600 is only for example, the coordinate computing apparatus 601 can also be applied to other systems or apparatuses. As shown in FIG. 6, the displacement detecting system 600 includes an object coordinate computing apparatus 601 and a display 603. The display 603 includes a light source 605, and the object coordinate computing apparatus 601 includes a camera 607 and a reading circuit 608. The camera 607 catches an image, which is a gray level diagram, for at least one object (the light source 605 in this embodiment). The reading circuit 608 scans pixels of at least one row in an image in turn, and records brightness values and coordinates for the pixels. The reading circuit 608 can perform the first embodiment shown in FIG. 2 and the second embodiment shown in FIG. 4 to determine which pixels are object pixels (i.e. the specific image pixels). Then the reading circuit 608 utilizes the recorded brightness values and the recorded coordinate to compute a gravity center of the light source 605. For more detail, the reading circuit 608 utilizes the brightness of the object pixels as weighting, and computing the gravity center of the object via multiplying the weight and the coordinates of the object pixels. Additionally, the coordinate computing apparatus 601 can further include a processor (not illustrated) to compute a displacement between the object coordinate computing apparatus 601 and the display referring to the light source 605. The processor further controls a cursor Cr according to the displacement.

In view of the first embodiment shown in FIG. 3, and the displacement detecting system shown in FIG. 6, the following object coordinate computing method can be acquired: (a) determining which pixels in the image have brightness values larger than a threshold value; (b) determining the pixels having brightness values larger than the threshold value as the object pixels of the object (such as pixels $P_{26}$, $P_{35}$-$P_{36}$, $P_{44}$-$P_{47}$ and $P_{55}$-$P_{56}$); and (c) determining pixels in a predetermined range of at least one the object pixel as the object pixels as well; and (d) computing a coordinate of the object according to the determining result of the steps (b) and (c).

In view of the second embodiment shown in FIG. 5, and the displacement detecting system shown in FIG. 6, the following object coordinate computing method can be acquired: (a) scan pixels of at least one row in an image in turn, and determine which pixels in the row is larger than a threshold value; (b) determine at least one first row object pixel (such as $P_{55}$, $P_{56}$), which has a brightness value larger than a threshold value, in a first row (Such as $L_1$ in FIG. 4) to be the object pixel, and defines a object range such as $W_1$ according to the first row object pixel; (c) determine a second row object pixel inside the range (such as $P_{45}$, $P_{46}$), which is located in the object range of a second row (such as $L_2$ in FIG. 4) after the first row, to be the object pixel while scanning the second row; and (d) computing a coordinate of the object according to the determining result of the steps (b) and (c).

In view of above-mentioned embodiments, the present invention provides an image determining method for determining specific image pixels or object pixels, an object coordinate computing method and an object coordinate computing apparatus, according to brightness and parameters besides brightness. By this way, the prior art issue that only brightness is utilized for determining can be avoided. Besides, different conditions can be set based on different object types and the size for caught images, such that the determining mechanism can be more accurate and can be set unlimitedly. Furthermore, the gravity center of the object can be moved downward if the gravity center is computed according to the image determining mechanism of the present invention. By this way, the gravity center matches the habit for a user while handling a remote controller, such that the displacement detecting can be more accurate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic apparatus control method performed by an object coordinate computing apparatus, for scanning an image and determining which pixels in the image are specific image pixels of a specific image, comprising:
   determining at least one pixel in a first row of the image having brightness value larger than a threshold value as the specific image pixel;
   defining a leftmost pixel and a rightmost pixel of the specific image pixel in the first row as a leftmost edge and a rightmost edge of a first specific image range;
   defining a second specific image range in a second row of the image, wherein the second row is next to the first row;
   wherein a column position of a leftmost edge of the second specific image range is determined based on a column position of the leftmost edge of the first specific image range;
   wherein a column position of a rightmost edge of the second specific image range is determined based on a column position of the rightmost edge of the first specific image range;
   wherein the specific image corresponding to an object image captured when the object coordinate computing apparatus pointing to an object; and
   wherein the electronic apparatus control method computes coordinates of the object and computes a displacement between the object coordinate computing apparatus and the object according to the coordinates.

2. The electronic apparatus control method of claim 1, wherein the leftmost edge of the second specific image range is positioned at an initial leftmost specific image pixel in the second row, and the rightmost edge of the second specific image range is positioned at an initial rightmost specific image pixel in the second row.

3. The electronic apparatus control method of claim 2, further comprising:
   extending the leftmost edge of the second specific image range to a pixel next to the initial leftmost specific image pixel in the second row when the pixel next to the initial leftmost pixel has brightness value larger than the threshold value.

4. The electronic apparatus control method of claim 2, further comprising:
   extending the rightmost edge of the second specific image range to a pixel next to the initial rightmost specific image pixel in the second row when the pixel next to the initial rightmost pixel has brightness value larger than the threshold value.

5. The electronic apparatus control method of claim 1, wherein the scanning of the image will be stopped if all the pixels within the second specific image range in the second row have brightness value smaller than a threshold value.

6. The image determining of claim 1, wherein the column position of the leftmost edge of the second specific image range is the same as the column position of the leftmost edge of the first specific image range, or the column position of the leftmost edge of the second specific image range is at a left side relative to the column position of the leftmost edge of the first specific image range.

7. The image determining of claim 1, wherein the column position of the rightmost edge of the second specific image range is the same as the column position of the rightmost edge of the first specific image range, or the column position of the rightmost edge of the second specific image range is at a right side relative to the column position of the rightmost edge of the first specific image range.

8. An object coordinate computing apparatus pointing to an electronic apparatus having an object, the object coordinate computing apparatus comprising:
   a camera, for catching a gray level diagram for an image comprising at least one object image;
   a reading circuit, configured to scan the image and to determine which pixels in the image are object image pixels of the object image, wherein the reading circuit performs following steps:
   recording brightness values and coordinates for the pixels and determining at least one pixel in a first row of the image having brightness value larger than a threshold value as the object image pixel;
   defining a leftmost pixel and a rightmost pixel of the object image pixel in the first row as a leftmost edge and a rightmost edge of a first object image range; and
   defining a second object image range in a second row of the image, wherein the second row is next to the first row;
   wherein a column position of a leftmost edge of the second object image range is determined based on a column position of the leftmost edge of the first object image range; and
   wherein a column position of a rightmost edge of the second object image range is determined based on a column position of the rightmost edge of the first object image range;
   wherein the reading circuit further utilizes the recorded brightness values and the recorded coordinate to compute a gravity center of the object;
   wherein the object coordinate computing apparatus further comprises a processor configured to compute a displacement between the object coordinate computing apparatus and the object according to the gravity center and the recorded coordinates, and configured to control an operation of the electronic apparatus according to the displacement.

9. The object coordinate computing apparatus of claim 8, wherein the leftmost edge of the second object image range is positioned at an initial leftmost object image pixel in the second row, and the rightmost edge of the second object image range is positioned at an initial rightmost object image pixel in the second row.

10. The object coordinate computing apparatus of claim 9, wherein the reading circuit further extends the leftmost edge of the second object image range to a pixel next to the initial leftmost object image pixel in the second row when the pixel next to the initial leftmost pixel has brightness value larger than the threshold value.

11. The object coordinate computing apparatus of claim 9, wherein the reading circuit further extends the rightmost edge of the second object image range to a pixel next to the initial rightmost object image pixel in the second row when the pixel next to the initial rightmost pixel has brightness value larger than the threshold value.

12. The object coordinate computing apparatus of claim 8, wherein the reading circuit stops the scanning if all the pixels within the second object image range in the second row have brightness value smaller than the threshold value.

13. The object coordinate computing apparatus of claim 8, wherein the column position of the leftmost edge of the second specific image range is the same as the column position of the leftmost edge of the first specific image range, or the column position of the leftmost edge of the second specific image range is at a left side relative to the column position of the leftmost edge of the first specific image range.

14. The object coordinate computing apparatus of claim 8, wherein the column position of the rightmost edge of the second specific image range is the same as the column position of the rightmost edge of the first specific image range, or the column position of the rightmost edge of the second specific image range is at a right side relative to the column position of the rightmost edge of the first specific image range.

\* \* \* \* \*